(12) United States Patent
O'Neill (10) Patent No.: US 12,543,699 B2
(45) Date of Patent: Feb. 10, 2026

(54) COMBINATION PET CARRIER AND PET BED

(71) Applicant: Rory O'Neill, Arlington Heights, IL (US)

(72) Inventor: Rory O'Neill, Arlington Heights, IL (US)

(*) Notice: Subject to any disclaimer, the term of this patent is extended or adjusted under 35 U.S.C. 154(b) by 194 days.

(21) Appl. No.: 18/229,253

(22) Filed: Aug. 2, 2023

(65) Prior Publication Data

US 2025/0040510 A1   Feb. 6, 2025

Related U.S. Application Data

(63) Continuation of application No. 16/993,205, filed on Aug. 13, 2020, now Pat. No. 11,771,051.

(51) Int. Cl.
*A01K 1/02* (2006.01)
*A01K 1/03* (2006.01)
*A01K 1/035* (2006.01)

(52) U.S. Cl.
CPC .......... *A01K 1/0245* (2013.01); *A01K 1/0353* (2013.01)

(58) Field of Classification Search
CPC ...... A01K 1/0245; A01K 1/0236; A01K 1/03; A01K 1/033; A01K 1/034; A01K 1/0353
See application file for complete search history.

(56) References Cited

U.S. PATENT DOCUMENTS

| D292,446 | S | * | 10/1987 | Gilbert | D3/238 |
|---|---|---|---|---|---|
| D294,748 | S | * | 3/1988 | Dobelle | D30/109 |
| D310,586 | S | * | 9/1990 | Dobelle | D30/109 |
| D311,610 | S | * | 10/1990 | Dobelle | D30/109 |
| 5,219,075 | A | * | 6/1993 | White | G10G 7/005 |
| | | | | | 190/125 |
| 5,685,257 | A | | 11/1997 | Feibus | |
| 5,931,120 | A | * | 8/1999 | Burns | A01K 1/0254 |
| | | | | | 119/497 |
| 6,021,740 | A | | 2/2000 | Martz | |
| 6,196,157 | B1 | | 3/2001 | Northrop et al. | |
| 6,305,318 | B1 | | 10/2001 | Ford | |
| 6,516,745 | B1 | | 2/2003 | Spires et al. | |
| 6,907,842 | B2 | | 6/2005 | Godshaw | |
| D539,486 | S | * | 3/2007 | Williams | D30/111 |

(Continued)

FOREIGN PATENT DOCUMENTS

CN         205161453 U   *   4/2016

OTHER PUBLICATIONS

Sarah I. travels, A Guide to Packing a Personal Item Like a Pro, Feb. 1, 2020, retrieved from internet: Oct. 12, 2025, https://www.sarahltravels.com/guide-packing-personal-item-like-pro/ (Year: 2020).*

(Continued)

*Primary Examiner* — Kristen C Hayes
(74) *Attorney, Agent, or Firm* — Michael P. Mazza, LLC; Michael P. Mazza (57) ABSTRACT

A transportable combination pet carrier and pet bed that can be dually used for travel or in the home. The case includes a pet bed that is located within the case, allowing for the pet to recline on the pet bed. The case may also include: 1) a sufficient amount of breathable and porous material, such that the pet does not suffocate when contained in the case, including when the case is fully closed and secured for transport; and 2) soft internal siding.

3 Claims, 8 Drawing Sheets

(56) References Cited

U.S. PATENT DOCUMENTS

| | | | | |
|---|---|---|---|---|
| 8,171,888 B2 * | 5/2012 | Chou | ................... | A01K 1/0254 |
| | | | | 119/497 |
| D661,895 S * | 6/2012 | Kinnard | ...................... | D3/271.2 |
| 8,225,746 B2 | 7/2012 | Song | | |
| 8,584,618 B1 | 11/2013 | Batson et al. | | |
| 8,628,371 B2 | 1/2014 | D'Alleva et al. | | |
| D720,929 S * | 1/2015 | Felice | ........................... | D3/289 |
| 9,301,493 B2 | 4/2016 | Renforth et al. | | |
| D760,561 S * | 7/2016 | Felice | ........................ | D3/271.1 |
| 9,392,766 B1 | 7/2016 | Elden | | |
| D883,659 S | 5/2020 | Lu | | |
| 12,004,480 B2 * | 6/2024 | Armstrong | ........... | A01K 1/0245 |
| 2008/0245312 A1 * | 10/2008 | Leung | .................. | A01K 1/0245 |
| | | | | 119/497 |
| 2011/0056441 A1 * | 3/2011 | Chang | .................. | A01K 1/0245 |
| | | | | 119/453 |
| 2019/0069510 A1 | 3/2019 | Otero | | |
| 2019/0183088 A1 | 6/2019 | Yang | | |
| 2022/0046893 A1 * | 2/2022 | O'Neill | ................ | A01K 1/0047 |

OTHER PUBLICATIONS

Comfi Pets Soft Sided Expandable Pet Carrier for Small Dogs Cats Airline Approved; Birchway Creations LLC; Amazon.com; Place of publication: United States; Date; May 13, 2020.

Jet Sitter; Jet Sitter Luxury Soft Sided Pet Carrier; Amazon.com; Place of publication: United States; Date: May 13, 2020.

Guitar Case Dog Bed; Pinterest; Joe Williams; https://www.pinterest.ch/pin/108438303500081904/?autologin=true; Place of publication: United States; Date: May 13, 2020.

My Guitar Case is Now a Cat Bed; Reddit; https://www.reddit.com/r/aww/comments/8u2ev8/my_guitar_case_is_now_a_cat_bed/; Place of publication: United States; Date: May 13, 2020.

Imperial Cat Play N Shapes Car Small Animal Hideout; Imperial Cat; chewy.com; Place of publication: United States; Date: May 13, 2020.

* cited by examiner

COMBINATION PET CARRIER AND PET BED

This is a continuation application claiming priority to U.S. Ser. No. 16/993,205, filed Aug. 13, 2020.

BACKGROUND OF THE INVENTION

The present invention generally relates to a transportable combination pet carrier and pet bed, in the shape of a musical instrument, including but not limited to a guitar. The combination pet carrier and pet bed may be used to transport a pet by any traditional means of travel, which explicitly includes, but is not limited to, travel by car, train, and airplane (both commercial and private). During airplane travel, the combination pet carrier and pet bed may be used as under-seat, carry-on commercial airline luggage, with the pet inside. The present pet carrier also fills a market void, as the pet carrier doubles as a pet bed for use in the home, or during camping, sporting events, concerts, and other similar activities.

Various pet carriers for travel are known; however, a consistent problem with these pet carriers is that they are not designed to easily function as both a travel pet carrier and a pet bed. For example, U.S. Pat. No. 6,907,842 ("Combination Pet Bed And Carrying Case") discloses a pet bed that doubles as a "car seat" carrying case for a pet, used primarily during car travel. However, unlike the present invention, this device does not allow for the user to easily carry the pet while it is contained in the case.

Other travel pet carriers are known, but these carriers lack the aesthetic appeal and functional advantage of utilizing a combination pet carrier and pet bed with a case shaped as a musical instrument, such as a guitar. It is known that pet owners are always looking for novel, new products to care for, and entertain, their pets (see e.g., U.S. Pat. No. 6,305,318, which discloses a pet bed in the shape of human shorts). The unique, musical instrument-shape of the present invention satisfies that need in the market. Moreover, the cost of production of the present invention may be less than, or equal to, pet carriers currently available on the market that do not incorporate a pet bed. The present invention is also designed with the comfort of the pet as a chief concern, as the disclosed combination pet bed and pet carrier is adequately ventilated, can include an extendable "screened in porch" for the pet, and may use soft material for the interior of the case to ensure the pet's safety and comfort.

Accordingly, a primary object of the present invention is to provide pet owners with a combination pet carrier and pet bed for a variety of uses, including travel or in-home use, with the case being in the shape of a musical instrument, including but not limited to a guitar.

Therefore, it would be advantageous to provide a combination pet carrier and pet bed with at least some of the above-referenced preferred characteristics.

SUMMARY OF THE INVENTION

The objects mentioned above, as well as other objects, are solved by the present invention, which overcomes disadvantages of prior pet carriers and pet beds, while providing new advantages not previously associated with such products.

This summary is provided to introduce a selection of concepts in a simplified form that are further described below in the Detailed Description, so that the claimed invention may be better understood. However, this summary is not intended to limit the scope of the claimed subject matter.

Accordingly, a primary object of the present invention is to provide a combination pet carrier and pet bed. In a preferred embodiment, the combination pet carrier and pet bed, which is a transportable case that dually functions as both a pet bed and as a pet carrier, may include: a pet bed that is located within the case, allowing for the pet to recline on the pet bed; a sufficient amount of breathable and porous material, such that the pet does not suffocate when contained in the case, including when the case is fully closed and secured for transport; and soft internal siding. The combination pet carrier and pet bed may also include at least one ventilated compartment extendible and retractable from both of, or either of, the top or bottom portions of the case.

The combination pet carrier and pet bed may include soft internal siding made of one or more of the following: mesh; rope; polyester; or Cordura® fabric. Additionally, the case may be opened and closed using one or more of the following fastening mechanisms: zippers; Velcro®; hinges; or buttons.

In a preferred embodiment, the combination pet carrier and pet bed includes: at least one of the side portions of the case that includes a laterally projecting section which is flat, sturdy, and rigid to provide stability and balance, such that the case can stand upright on the laterally projecting section; and one or more flat, sturdy, and rigid laterally projecting edges extending from the case to facilitate balance of the case in an upright position when the case is lying on its side portion.

In another preferred embodiment, the combination pet carrier and pet bed is in the general shape of a musical instrument. The combination pet carrier and pet bed may be guitar-shaped and include: a bulbous first end tapering to a long, narrowed-neck opposing second end; and at least one carrying strap or handle. The bulbous first end of the guitar-shaped case may also include at least one extendable and retractable ventilated compartment.

Preferably, the weight of the case, excluding the weight of any pet, is less than about 6 pounds. Additionally, the combination pet carrier and pet bed may also include: side portions of the case that are made of a crush-proof, leak-proof material; internal siding made of an absorbent material; side portions of the case made of Cordura® fabric or rubber; a pocket on an external surface of the case, intended to hold personal items and accessories, including but not limited to pet care supplies and food; and one or more ventilated openings, which may be rimmed to prevent blockage of the opening, such that a rigid, crush proof ring extends outward from the ventilated opening and surrounds at least a portion of the boarder of the ventilated opening.

Finally, in another preferred embodiment, the combination pet carrier and pet bed: has a length of about or less than 18 inches, a width of about or less than 11 inches, and a height of about or less than 11 inches; includes a pet bed that is removable from the case, allowing the pet to use the pet bed while not carried or contained by the case; is capable of being opened and closed, and when opened exposes at least a majority of the internal surface area of the case, thereby allowing the pet to enter or exit the case; and includes a pet bed that is situated within the case so that the pet may recline on the pet bed when the case is in a fully closed and in a secured position.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"Cordura® fabric" means any fabric, typically made of nylon, or blended with cotton or other natural fibers, that is durable and resistant to abrasions, tears and scuffs, and which is acceptable for use in products such as luggage, bags, carrying cases, backpacks, and pet carriers.

"Pet" means any animal that may be cared for by humans.

"Pet bed" means any portion of the interior of a transportable case that is suitable for holding a pet where the pet may lay down to rest, stretch, etc., while the case is in transit or stationary, and which may include but is not limited to the following: 1) a cushion, which may be soft, removable and washable, located in the case; or 2) a flat, bottom surface of a ventilated (e.g., extendable and retractable) compartment.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
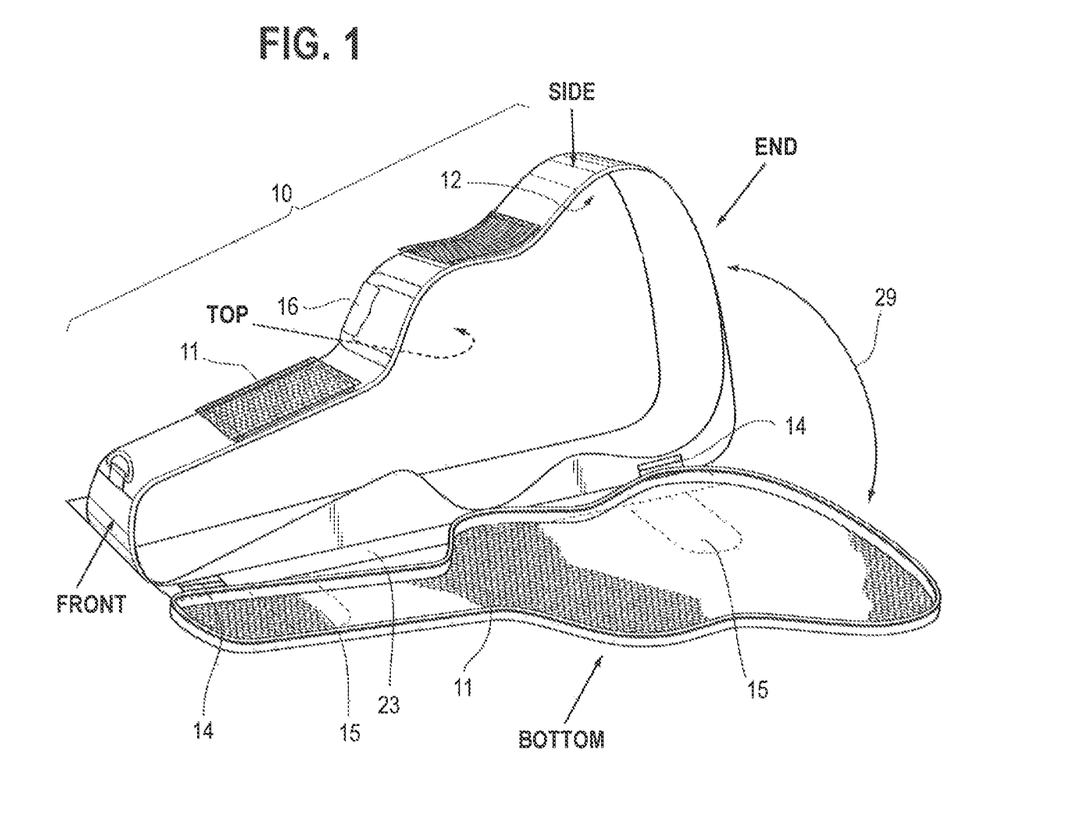
FIG. 1 is a bottom, front and side view of a preferred embodiment of the combination pet carrier and pet bed case, in an open or closed position.
Figure 4:
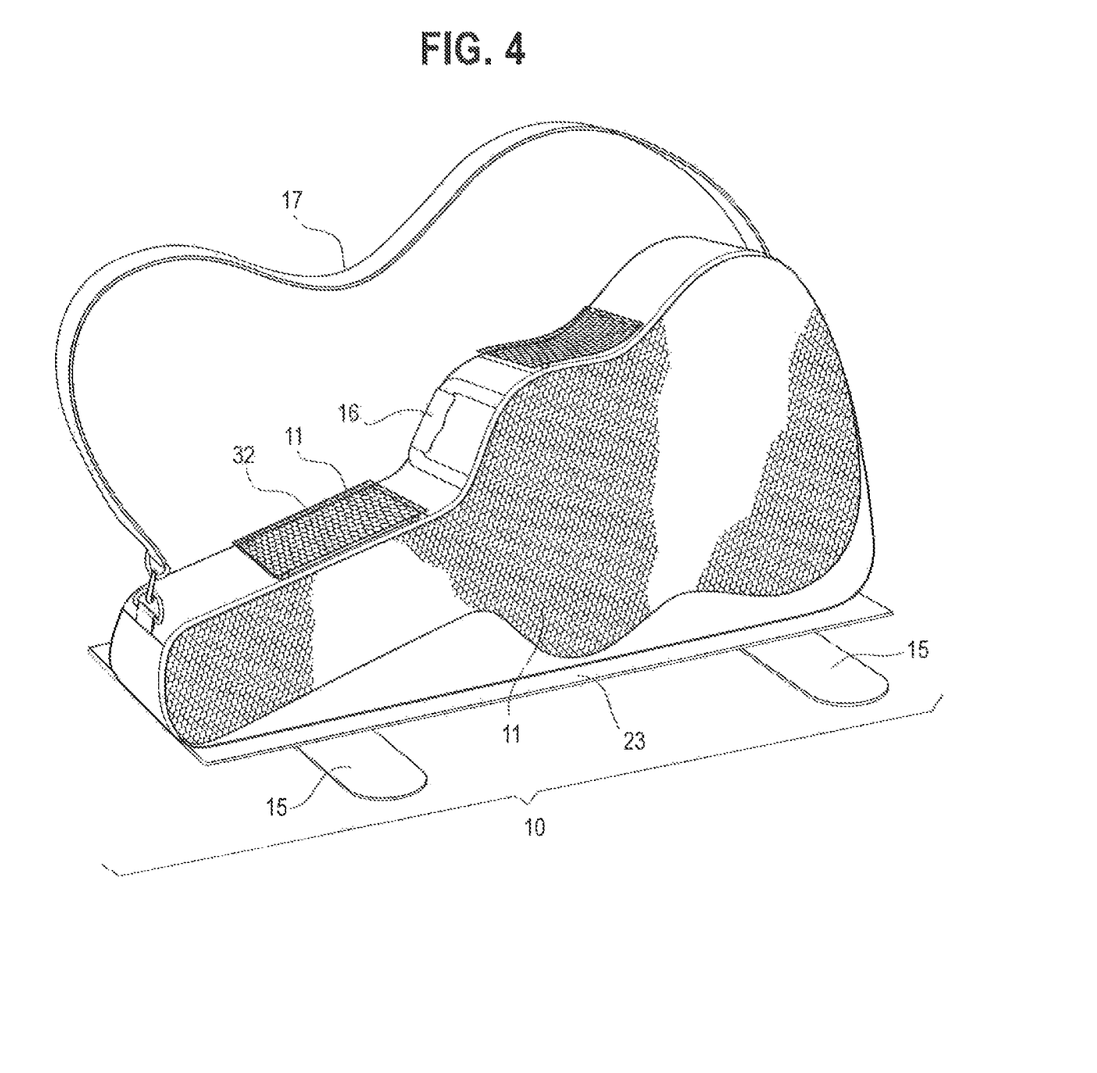
FIG. 4 is a bottom, front and side view of a preferred embodiment showing the carrying handle and shoulder strap.

In the preferred embodiments shown at FIGS. 1 and 4, the guitar-shaped combination pet carrier and pet bed cases 10 are shown, which display the following main components: 1) a sufficient amount of breathable and porous material 11, such that the pet is safely and comfortably ventilated when contained in the case, while being stored with all openings and compartments either being open, or closed and secured; 2) as shown in FIG. 4, the breathable ventilated mesh 11 may be rimmed 32, such that a rigid, crush proof ring extends outward from the ventilated opening 1 and surrounds at least a portion of the boarder of the ventilated openings/mesh 11, to prevent air blockage by another object, such as a suitcase, pressing up against the mesh 11; 3) as shown in FIG. 1, soft siding 12, made of mesh, polyester, or any other similar material, on the interior of the case, to ensure that the pet contained in the case is safe and comfortable; 4) a laterally projecting side portion of the case 23, which is flat, sturdy, and rigid to provide stability and balance, which may have at least one laterally protruding edge 15, such that the case can stand upright on the laterally projecting sections; 5) a carrying handle is shown in both preferred embodiments 16, while FIG. 4 shows a carrying shoulder strap 17; 6) as shown in FIG. 1, an opening to the bottom of the case 29, that can be secured with a fastening mechanism, such as a hinge 14, such that the pet can enter and exit the case; and 7) as shown in FIG. 1, the opening and closing mechanism of the bottom of the case 29, does not move or involve the laterally projecting side portion of the case 23, or the laterally protruding edge(s) 15, such that these portions of the case 23, 15 can remain fixed to the ground for stability.

Figure 2:
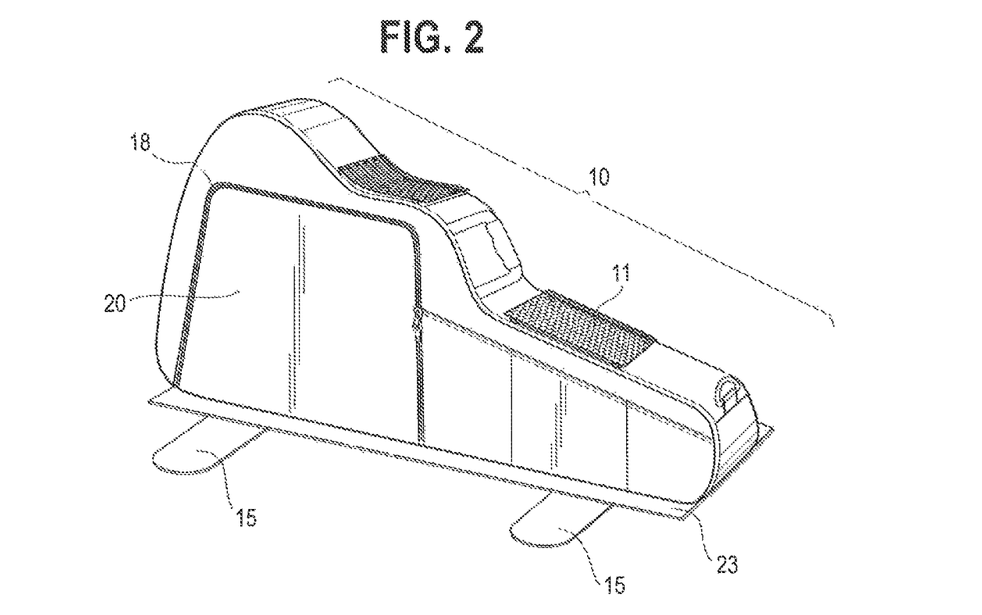
FIG. 2 is a top, front and side view of a preferred embodiment of the combination pet carrier and pet bed case, showing the extendable and retractable pet ventilation compartment in the closed position.
Figure 3:
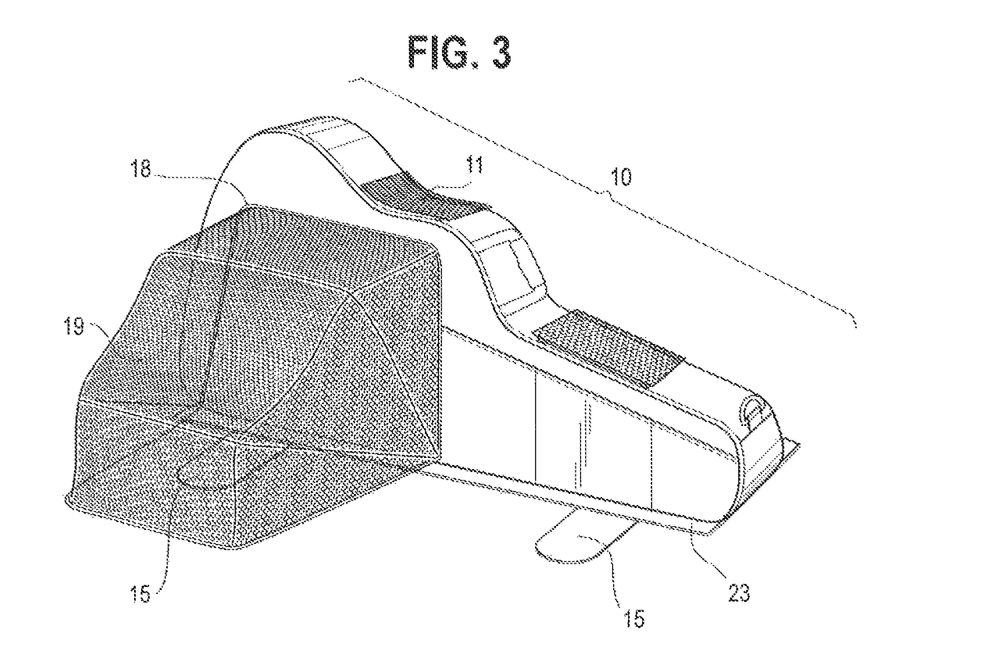
FIG. 3 is a top, front and side view of a preferred embodiment of the combination pet carrier and pet bed case, showing the extendable and retractable pet ventilation compartment in the open position.

In the preferred embodiments shown at FIGS. 2 and 3 the guitar-shaped combination pet carrier and pet bed cases 10 are shown, which display the following main components: 1) a sufficient amount of breathable and porous material 11, such that the pet is safely and comfortably ventilated when contained in the case, while being stored with all openings and compartments either being open, or closed and secured; 2) a laterally projecting side portion of the case 23, which is flat, sturdy, and rigid to provide stability and balance, which may have at least one laterally protruding edge 15, such that the case can stand upright on the laterally projecting sections; and 3) an extendable and retractable ventilated compartment 18, which can be opened 19, as shown in FIG. 3, or closed 20, as shown in FIG. 2, from either, or both of, the top and bottom portions of the case.

Figure 5:
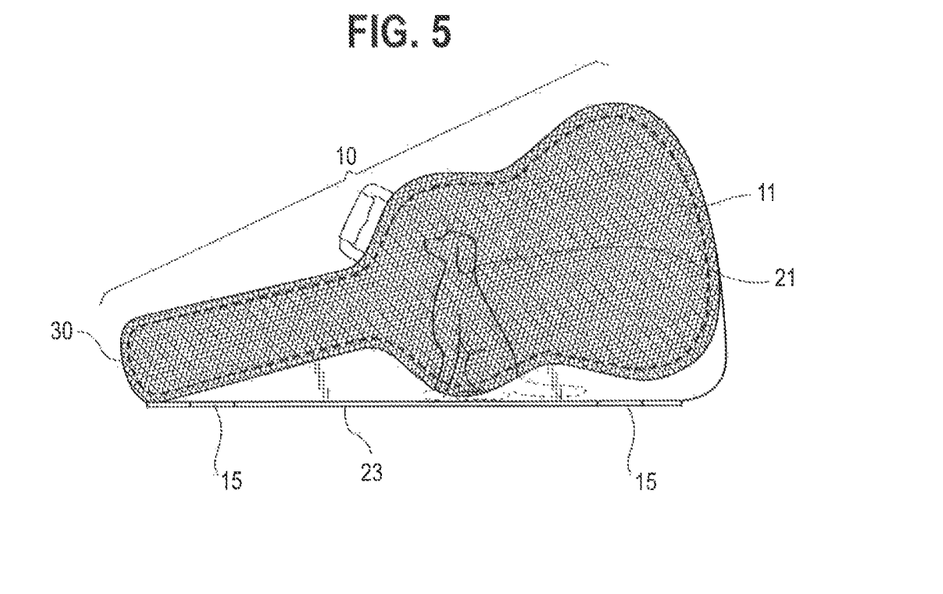
FIG. 5 is a bottom view of a preferred embodiment of the combination pet carrier and pet bed case, showing the pet bed on the top of the case.

In the preferred embodiment shown at FIG. 5, the guitar-shaped combination pet carrier and pet bed case 10 is shown, which displays the following main components: 1) a sufficient amount of breathable and porous material 11, such that the pet is safely and comfortably ventilated when contained and stored in the case with all openings and compartments being closed and secured; 2) a laterally projecting side portion of the case 23, which is flat, sturdy, and rigid to provide stability and balance, which may have at least one laterally protruding edge 15, such that the case can stand upright on the laterally projecting sections; 3) sufficient space within the case, such that a pet is able to comfortably stand, turn around and lie down, or other similar activity, within the enclosed case 21; and 4) a pet bed secured to, or resting on, at least one of the portions of the case, including but not limited to the top of the case 30.

Figure 6:
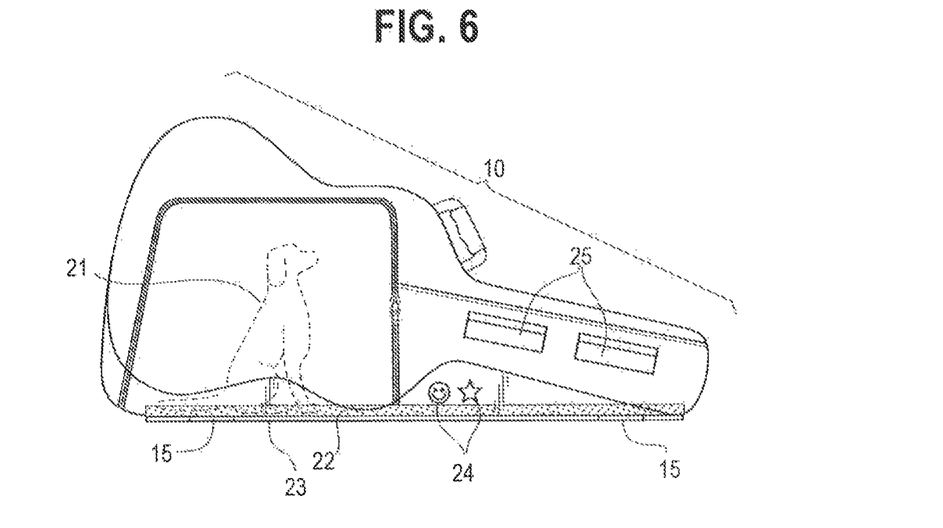
FIG. 6 is a top view of a preferred embodiment of the combination pet carrier and pet bed case, showing the pet ventilation compartment in the closed position.
Figure 7:
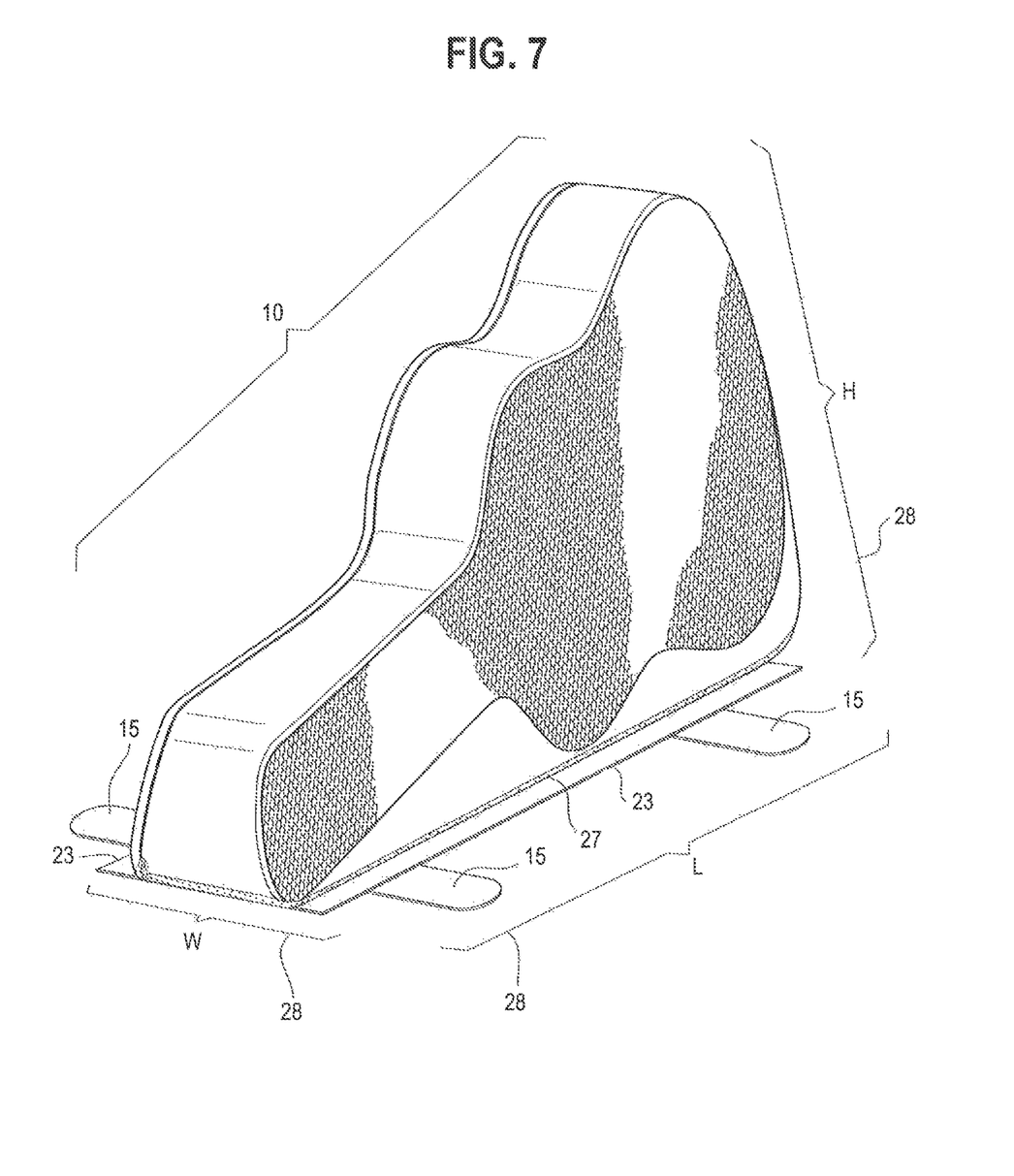
FIG. 7 is perspective view showing the length, width and height of a preferred embodiment of the combination pet carrier and pet bed case, showing the laterally projecting section of the side of the case.

In the preferred embodiment shown at FIG. 6, the guitar-shaped combination pet carrier and pet bed case 10 is shown, which displays the following main components: 1) sufficient space within the case, such that a pet is able to comfortably stand, turn around and lie down, or other similar activity, within either the open, or closed and secured case 21, while the case is stored; 2) portions of the case that are sufficiently rigid and supportive to allow for stickers, and other similar objects, to be adhered to the case 24; 3) pockets configured to hold personal items and accessories, including but not limited to pet care supplies and food 25; 4) the flat interior, side portion of the case comprised of crush proof, leak proof material 22, such as Cordura® fabric, which will retain accidental pet waste expelled within the case to minimize mess and facilitate clean-up; and 5) a laterally projecting side portion of the case 23, which is flat, sturdy, and rigid to provide stability and balance, and which may have at least one laterally protruding edge 15, such that the case can stand upright on the laterally projecting edge(s) (e.g., FIG. 7).

In the preferred embodiment of FIG. 7, the guitar-shaped combination pet carrier and pet bed case 10 is shown, which displays the following main components: 1) the flat interior, side portion of the case has a crush-proof, leak-proof material that is absorbent 27, such that accidental pet waste expelled within the case is absorbed to minimize mess, and clean-up or replacement of the absorbent material is possible; and 2) a laterally projecting side portion 23, which is flat, sturdy, and rigid to provide stability and balance, and which may have at least one laterally protruding edge 15, such that the case can stand upright on the laterally projecting edge(s) (e.g., FIG. 7).

The dimensions of a preferred embodiment of the case may have a length of about 18 inches, a width of about 11 inches, and a height of about 11 inches, to allow for the case, containing the pet, to be stored in the under-seat carry-on space, during commercial airline travel, in compliance with all applicable laws, rules, regulations, guidelines, or other similar authority. For perspective as to the dimensions of the preferred embodiment shown in FIG. 7, a typical guitar case, for the instrument itself, has a length of about 35 inches, a height of about 18 inches, and a width of about 6 inches.

Figure 8:
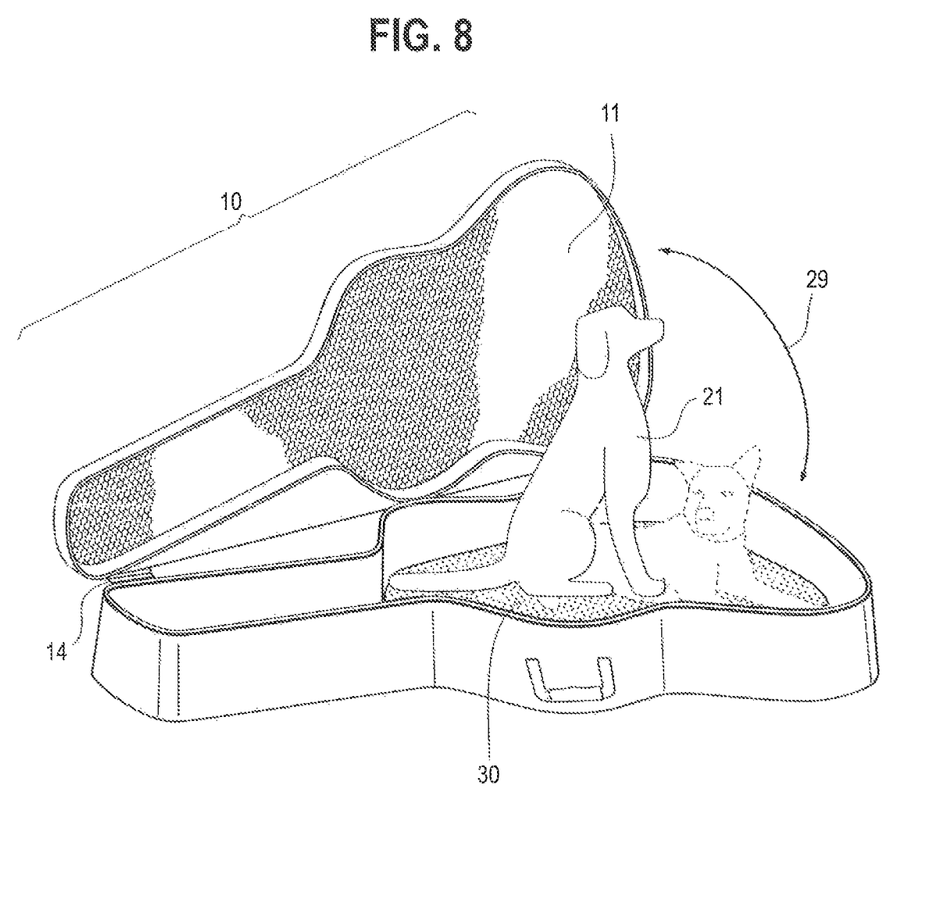
FIG. 8 is a front, side and bottom view of a preferred embodiment of the combination pet carrier and pet bed case, showing the case lying on its top with the bottom face of the case open, and with the pet inside the case.

In the preferred embodiment of FIG. 8, the guitar-shaped combination pet carrier and pet bed case 10 is shown, during stationary in-home use, with the bottom of the case being open or closed 29 with a hinge 14, such that the pet can comfortably move around within the case, whether the case is open or closed, and use and lie down on the pet bed secured to the top of the case 30. This version of the pet bed 30 may be removable from the case to allow for easy cleaning of the pet bed, and to allow for the pet to use the pet bed, completely separate from the case.

Figure 9:
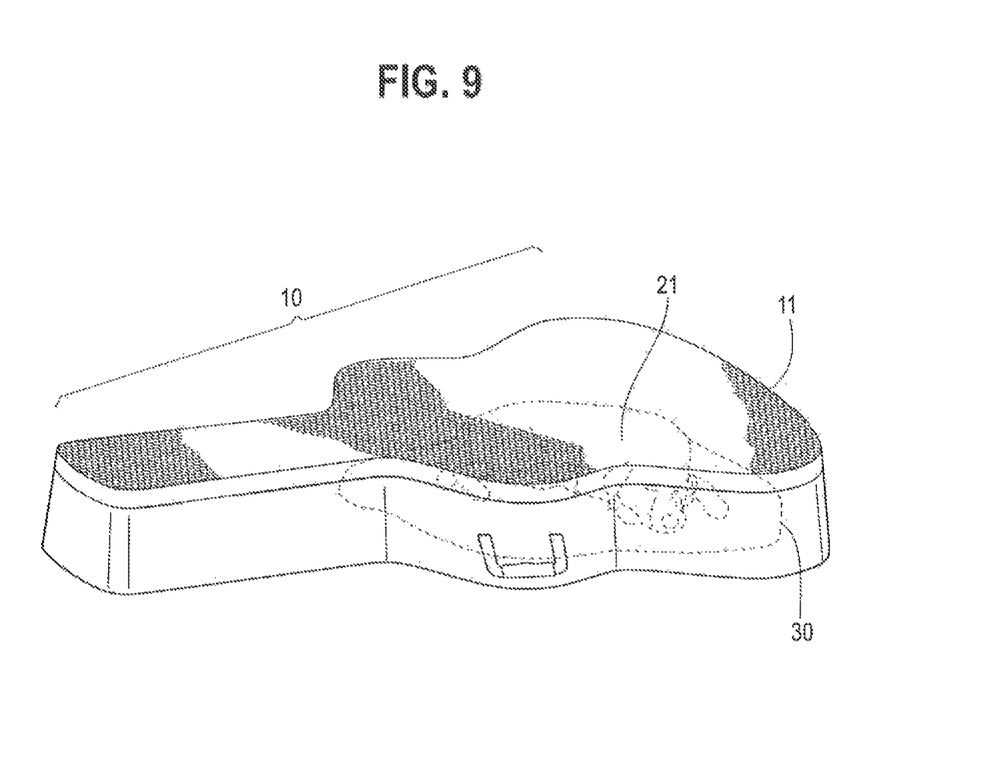
FIG. 9 is a front, side and bottom view of a preferred embodiment of the combination pet carrier and pet bed case, showing the case lying on its top with the bottom face of the case closed, and with the pet inside the case.

In the preferred embodiment of FIG. 9, the guitar-shaped combination pet carrier and pet bed case 10 is shown, with the bottom of the ventilated 11 case being closed, such that the pet 21 can comfortably rest on the pet bed 30, within the stored case that is fully closed and secured.

Figure 10:
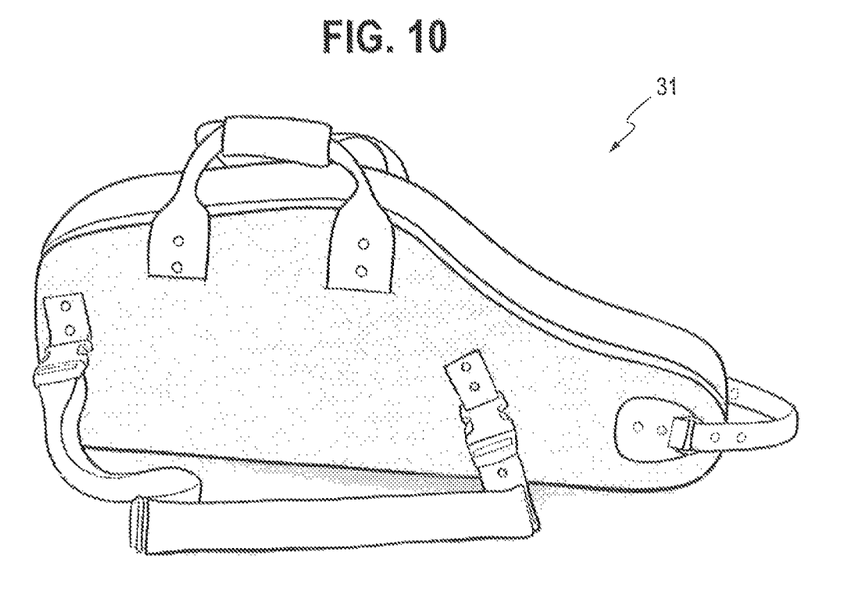
FIG. 10 is a top and side view of an alternative embodiment of the combination pet carrier and pet bed case, which shows a saxophone-shaped musical instrument case.

Finally, in the preferred embodiment of FIG. 10, a saxophone-shaped case 31 is shown to demonstrate that the combination pet carrier and pet bed may be in the shape of a wide variety of musical instrument cases, and is not limited to the guitar-shaped case shown in FIGS. 1-9.

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A transportable pet carrier with a pet bed, comprising:
    an air permeable transportable case with rigid, opposing sidewalls, the case being capable of standing upright in a vertical position or laying on its side in a horizontal position, the case having a wider first end with an interior space including padded internal siding supporting the pet bed, and the case having a narrower opposing second end, wherein the interior space of the case can be entered or exited by a pet, and wherein the case can be closed and secured for transport while also simultaneously allowing the pet to breathe; and
    the pet bed being removably located within the case, and the interior space and the pet bed being configured to enable the pet to be located within the interior space and capable of lying entirely on the pet bed: (1) when the case is either open or closed; or (2) when the case is stationary or during transport of the case; or (3) when the case is in either of the vertical or horizontal positions;
    wherein the case can be transported while the pet is supported by the pet bed within the interior space of the case, thereby allowing the pet carrier to simultaneously function as both a pet carrier and a pet bed; and
    wherein the case has a length of no more than about 18 inches, and a width and height of each no more than about 11 inches, enabling the case to be stored in the under-seat carry-on space of an airplane; and
    wherein at least one edge of the case includes one or more laterally projecting sections which are flat and rigid, providing stability and balance, such that the case can stand upright in a vertical position on the one or more laterally projecting sections.

2. The transportable pet carrier with a pet bed of claim 1, wherein the case is in the shape of a guitar.

3. A transportable pet carrier with a pet bed, comprising:
    an air permeable transportable case with rigid, opposing sidewalls, the case being capable of standing upright in a vertical position or laying on its side in a horizontal position, the case having a wider first end with an interior space including padded internal siding supporting the pet bed, and the case having a narrower opposing second end, wherein the interior space of the case can be entered or exited by a pet, and wherein the case can be closed and secured for transport while also simultaneously allowing the pet to breathe; and
    the pet bed being removably located within the case, and the interior space and the pet bed being configured to enable the pet to be located within the interior space and capable of lying entirely on the pet bed: (1) when the case is either open or closed; or (2) when the case is stationary or during transport of the case; or (3) when the case is in either of the vertical or horizontal positions;

wherein the case can be transported while the pet is supported by the pet bed within the interior space of the case, thereby allowing the pet carrier to simultaneously function as both a pet carrier and a pet bed; and wherein the padded internal siding comprises an absorbent material.

* * * * *